(12) United States Patent
Waldron et al.

(10) Patent No.: US 7,883,039 B2
(45) Date of Patent: Feb. 8, 2011

(54) CONTINUOUS GRANULATING AND DRYING APPARATUS INCLUDING MEASUREMENT UNITS

(75) Inventors: Michel Simon Waldron, Southampton (GB); Trevor Gordon Page, Southampton (GB); Tomas Vermeire, Temse (BE)

(73) Assignee: Collette NV, Wommelgem (BE)

( * ) Notice: Subject to any disclaimer, the term of this patent is extended or adjusted under 35 U.S.C. 154(b) by 866 days.

(21) Appl. No.: 11/679,494

(22) Filed: Feb. 27, 2007

(65) Prior Publication Data

US 2008/0203200 A1    Aug. 28, 2008

(51) Int. Cl.
  *B02C 19/00*    (2006.01)
(52) U.S. Cl. .................... 241/65; 241/101.2
(58) Field of Classification Search ............ 241/60, 241/101.2, 39, 79, 65
  See application file for complete search history.

(56) References Cited

U.S. PATENT DOCUMENTS

| | | | |
|---|---|---|---|
| 4,111,371 A  * | 9/1978 | Melliger | .............. 241/18 |
| 5,395,449 A | 3/1995 | Quadir et al. | |
| 6,499,984 B1 * | 12/2002 | Ghebre-Sellassie et al. | . 425/135 |
| 2004/0037785 A1 * | 2/2004 | Staniforth et al. | ............. 424/46 |
| 2004/0089753 A1 * | 5/2004 | Holland et al. | ................ 241/21 |
| 2007/0048373 A1 * | 3/2007 | Chastain et al. | ............ 424/464 |

FOREIGN PATENT DOCUMENTS

| | | |
|---|---|---|
| DE | 31 03279 A1 | 1/1983 |
| EP | 0 289 074 A1 | 4/1988 |
| EP | 0770423 A2 | 5/1997 |
| GB | 698374 | 10/1953 |
| GB | 1164026 | 9/1969 |
| JP | 11-91950 | 4/1999 |
| JP | 2001-26320 A | 1/2001 |
| WO | 00/17549 | 3/2000 |
| WO | 2006/067544 A1 | 6/2006 |

OTHER PUBLICATIONS

International Search Report; Mar. 25, 2009.

* cited by examiner

*Primary Examiner*—Faye Francis
(74) *Attorney, Agent, or Firm*—Sughrue Mion, PLLC

(57) ABSTRACT

A continuous granulating and drying apparatus includes a granulator and a dryer. Measurement of product and process parameters is carried out by means of measurement units positioned at critical locations in the apparatus.

10 Claims, 10 Drawing Sheets

CONTINUOUS GRANULATING AND DRYING APPARATUS INCLUDING MEASUREMENT UNITS

BACKGROUND OF THE INVENTION

The present invention relates to a continuous granulating and drying apparatus for pharmaceutical products, comprising a granulator and a dryer, the granulator including a granulation chamber having a first end with an inlet for powder material and a binder feed port, and a second end with an outlet for granulated product, the dryer having a granulated product supply conduit and a product discharge conduit.

SUMMARY OF THE INVENTION

An object of the present invention is to provide a continuous granulating and drying apparatus, whereby it is possible to improve the quality and consistency of the products produced by means of the apparatus.

In view of this object, said apparatus includes a plurality of measurement units.

In this way, certain product and process parameters may be monitored at critical control points in the apparatus.

In a preferred embodiment, said plurality of measurement units includes a first measurement unit located at the inlet of the granulation chamber, a second measurement unit located at the outlet of the granulation chamber, and a third measurement unit located at the product discharge conduit of the dryer.

In a further development of this preferred embodiment, said plurality of measurement units further includes a fourth measurement unit located at the granulated product supply conduit of the dryer and a fifth measurement unit arranged to communicate with the interior of the dryer.

Advantageously, the at least one parameter being measured is selected from the group comprising size, shape, density, moisture content, and content of active substance.

In a further embodiment, each measurement unit of said plurality of measurement units is connected to a control system.

The invention further relates to a method of continuous granulation and drying of pharmaceutical products in the form of powder material, whereby material and binder are fed into an inlet a first end of a longitudinal granulation chamber, the material is granulated in the granulation chamber, granulated product is discharged from an outlet at a second end of the granulation chamber and guided to a granulated product supply conduit of a dryer, the material is dried in the dryer and is discharged through a product discharge conduit of the dryer, at least one parameter being measured at a plurality of measurement units.

BRIEF DESCRIPTION OF THE DRAWINGS

The invention will now be explained in more detail below by means of examples of embodiments with reference to the very schematic drawing, in which.

DETAILED DESCRIPTION OF THE INVENTION

Figure 1:
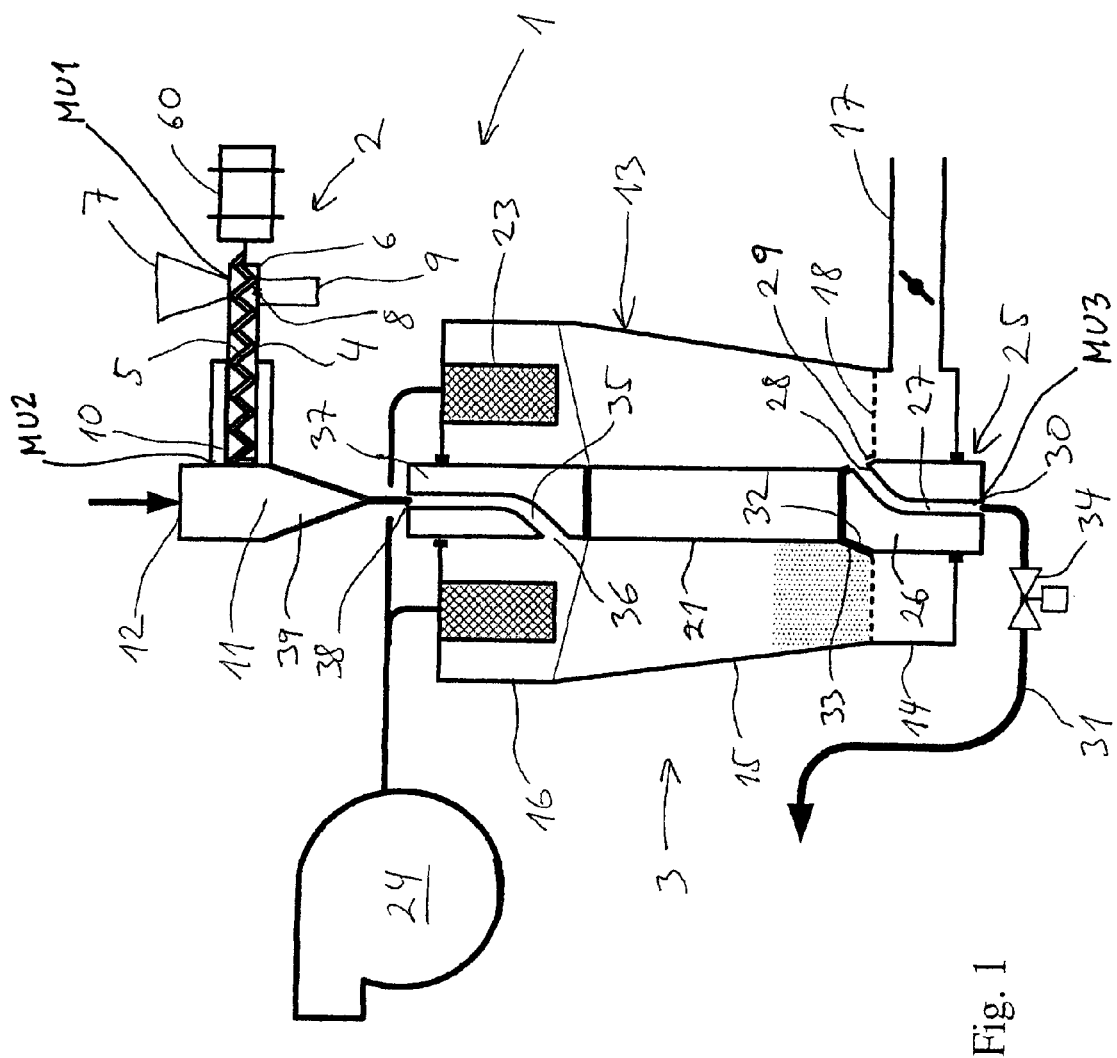
FIG. 1 shows in diagrammatic form a continuous granulating and drying apparatus according to the invention, comprising a horizontal screw granulator that is closely coupled to a fluid bed dryer.

FIG. 1 shows a continuous granulating and drying apparatus 1 for pharmaceutical products according to the invention. In the embodiment shown, the apparatus comprising a horizontal screw granulator 2 that is closely coupled to a fluid bed dryer 3. In general, the granulator may be of any suitable kind known in the art, i.e. a screw granulator, a twin-screw granulator having two parallel rotary shafts, or an extruder. As will be described in further detail below, the granulator need not be horizontal but may be positioned at an angle with the horizontal or be positioned vertically. Furthermore, the dryer may be any kind of dryer suitable to the purpose.

The screw granulator 2 comprises a longitudinal granulation chamber 4 in which two parallel rotary shafts, of which only one 5 is shown, are arranged. On each shaft 5 is arranged a plurality of granulating elements. However, any suitable number of shafts provided with granulating elements may be arranged in the granulation chamber 4 in any suitable way. In addition, the number of granulating elements on a shaft may be varied in order to obtain a desired performance of the screw granulator 2. The rotary shafts are journalled at each end in not shown bearings and driven by means of a drive unit 60. In the embodiment shown in FIG. 1, the screw granulator 2 is horizontally arranged; however, the granulation chamber 4 and the rotary shafts 5 may also be tilted by an angle with the horizontal, for instance by an angle of up to 70 degrees.

At a first end 6 of the granulation chamber 4 is arranged an inlet 7 in the form of a downwardly tapering funnel through which powder material may fall by means of gravity into the granulation chamber 4 at the first end 6. Alternatively, a forced feed system may be utilized for introducing the feed into the granulation chamber. Two or more inlets may also be provided. In order to ensure a regular supply of the powder material to the granulation chamber 4, a not shown impeller may be arranged in the funnel on a vertical spindle driven by a not shown drive motor.

A binder feed port 8 is arranged through the wall of the granulation chamber 4 at the first end 6. A feed pump 9 is arranged immediately adjacent the granulation chamber communicating directly with the binder feed port 8. Additional binder feed ports and additional feed pumps may be arranged at the first end or along the granulation chamber. The feed pump 9 may work in a well-known manner. The feed pump is independently supplied with liquid, solution, suspension, gas, or any combination thereof. The active substance may be supplied to the granulator 2 mixed with excipients. Alternatively, the active substance and the excipients may be supplied separately, and then mixed in the granulator.

At a second end 10 of the granulation chamber 4, an outlet 11 for granulated product is arranged. Opposite the outlet in relation to the granulation chamber 4, a transport air inlet 12 is arranged, whereby transport air may be drawn in the direction of the outlet diametrically across the second end 10 of the granulation chamber 4, thereby carrying granulated product from the granulation chamber to the outlet 11.

Figure 2:
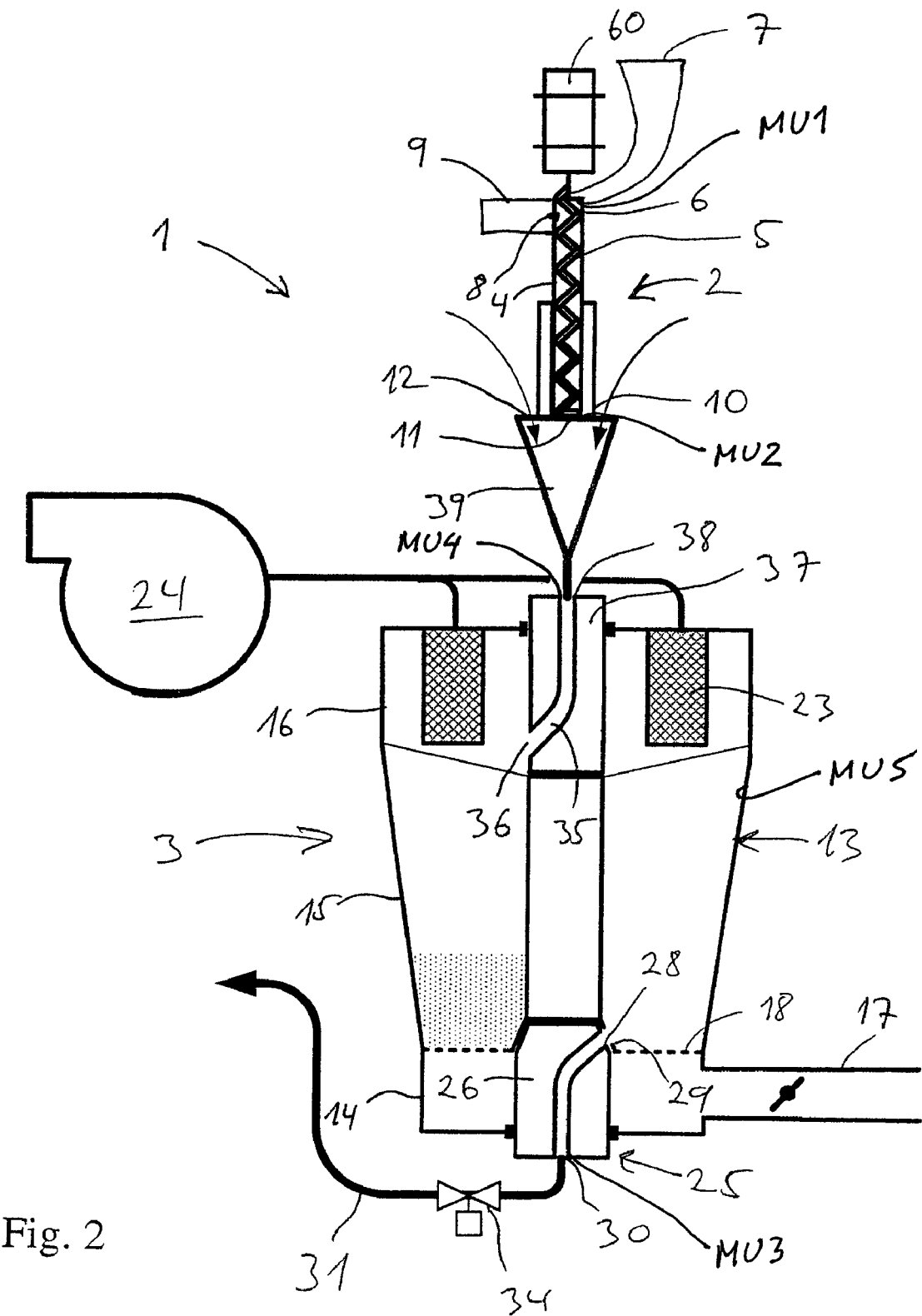
FIG. 2 shows an apparatus similar to that of FIG. 1, whereby the screw granulator is vertical.

FIG. 2 shows another embodiment of the continuous granulating and drying apparatus 1 according to the invention, whereby the apparatus comprises a vertical screw granulator 2 that is closely coupled to a fluid bed dryer 3. In this embodiment, the transport air inlet 12 is arranged around the outlet 11 of the granulation chamber 4, so that transport air may carry granulated product away from the outlet 11 in the direction of the fluid bed dryer 3. Due to the vertical arrangement of the granulation chamber 4 and the rotary shafts 5, the powder material advances downwardly through the granulation chamber 4 substantially as a result of the gravity. The granulation chamber 4 and the rotary shafts 5 may also be tilted by an angle with the vertical, for instance by an angle of up to 70 degrees. Different tilt angles will result in different capacities of the granulator. In the vertical arrangement of the screw granulator 2 shown in FIG. 2, the gravity will cause a relatively large capacity of the granulator, and by an inclination of the shafts of 70 degrees in relation to the vertical, the gravity will result in a relatively smaller capacity of the granulator. The tilt angle of the shafts may be adjustable manually or automatically.

Figure 8:
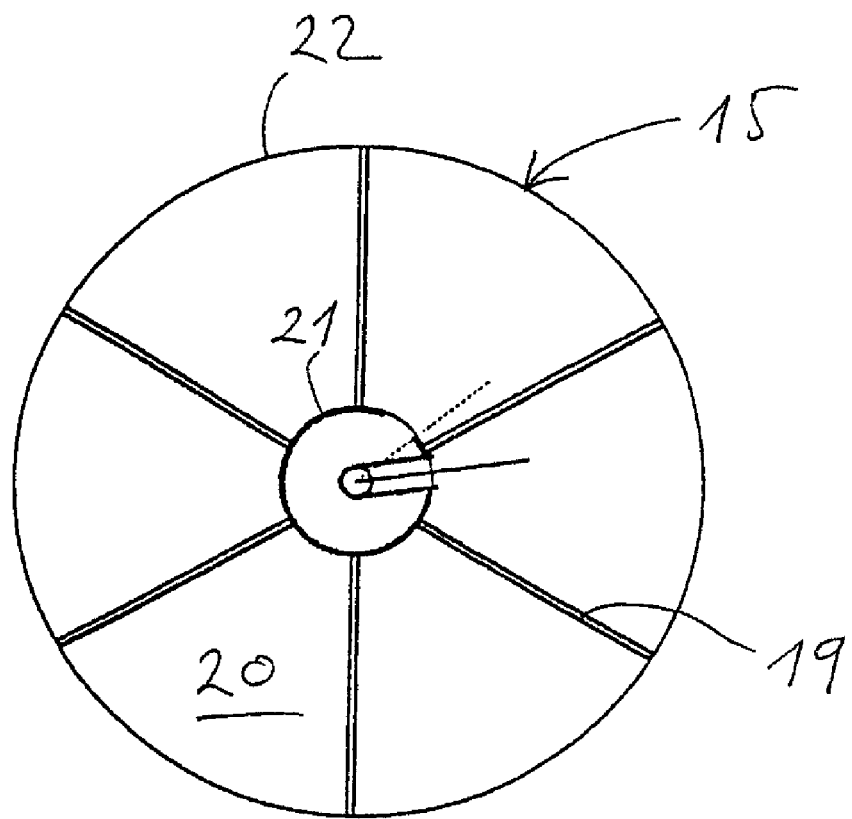
FIG. 8 is a diagrammatic top view of the fluid bed dryer of the continuous granulating and drying apparatus of FIGS. 1 to 5.

The fluid bed dryer 3 of the continuous granulating and drying apparatus 1 according to the invention comprises a housing 13 composed of a plenum chamber 14, on the top of which is mounted a processing chamber constituted by a common vessel 15 with a conical cross-section, and on the top of which is mounted a filter chamber 16. The plenum chamber 14 has an inlet 17 for fluidizing gas, and between the plenum chamber 14 and the common vessel 15 is arranged a bed plate 18 having openings for the passage of fluidizing gas. As illustrated in FIG. 8, the common vessel 15 is by means of partition walls 19 divided into six separate processing compartments 20. However, the common vessel 15 may be divided into any suitable number of separate processing compartments. The partition walls 19 extend radially from an inner wall 21 of the housing 13 to the outer wall 22 of the common vessel. At their lower edge, the partition walls 19 abut the bed plate 18.

The bed plate 18 may be manufactured from a single plate of sheet metal or composed of six plate sections corresponding to the six separate processing compartments 20, respectively. The bed plate or plate sections may be fabricated in a well-known manner by stamping several holes in the form of perforations in the plate so that each hole is associated with a gill portion, for example as described in EP 0 474 949 B1 (NIRO HOLDING A/S), EP 0 507 038 B1 (NIRO HOLDING A/S), or EP 0 876 203 B1 (NIRO A/S) and marketed as FLEX PLATE™, NON-SIFTING GILL PLATE™ and BUBBLE PLATE™, respectively. The not shown gill portions of the bed plate may be adapted to promote the transportation of product to the location of an outlet opening of each respective processing compartment arranged in the inner wall, which will be described in more detail below. The size and directions of the perforations may differ throughout the bed plate or sections thereof.

The filter chamber 16 is by means of a not shown flange connection connected to the common vessel 15 and comprises a number of filters 23 being arranged in a manner known per se for filtering the fluidizing gas before discharge by means of a fan 24. Furthermore, the common vessel 15 may by means of a not shown flange connection be connected to the plenum chamber 14, whereby a modular composition may be obtained. In addition, the inlet 17 of the plenum chamber 14 may by means of a flange connection be connected with a supply of fluidizing gas, such as a fan 67; see FIGS. 3 to 5. Thereby, the common vessel 15 and the plenum chamber 14 may, as a module, replace similar components of a fluidizing apparatus of a different design, for instance a conventional batch-type apparatus. The flange connections may be assembled by means of air cylinder driven clamping devices or similar suitable devices.

Referring to FIGS. 1 to 5 and 9, a plug valve 25 is arranged centrally in the plenum chamber 14 and has a plug 26 arranged rotatably coaxially with the common vessel 15. The plug 26 comprises a product discharge conduit 27 arranged rotatably with the plug 26 and having a first end opening 28 that by rotation of the plug 26 selectively may communicate with an outlet opening 29 of any one of the processing compartments 20. A second end opening 30 of the product discharge conduit 27 is rotatably connected with an outlet tube 31 arranged below the plug valve 25. A butterfly valve 34 is arranged in the outlet tube 31, whereby the product discharge may be regulated. However, other types of valve may be employed. The first end opening 28 of the product discharge conduit 27 is located in a conical section 32 of the plug 26, and the outlet opening 29 of each separate processing compartment is located in a conical section 33 of the inner wall 21 of the housing 13. The conical section 32 of the plug 26 fits substantially tightly into the conical section 33 of the inner wall 21. The conical sections 32, 33 ensure good performance in terms of tightness and friction.

Furthermore, the fluid bed dryer 3 has a rotatably arranged granulated product supply conduit 35 in the form of a pipe section having, at a first end, an opening 36 through which product may be supplied, directly from the supply conduit 35, selectively to each of the separate processing compartments 20, by rotating a cylindrical element 37 comprising the granulated product supply conduit 35, so that the opening 36 is located within the free space between two partition walls 19 delimiting the respective processing compartment 20 on either side. At a second end, the product supply conduit 35 has a rotational coupling 38.

The cylindrical element 37 comprising the granulated product supply conduit 35 and the plug 26 comprising the product discharge conduit 27 are rotatable independently by means of two separate, not shown, drive motors, respectively. Thereby, good flexibility with regard to the control of the supply of product to and the discharge of product from the separate processing compartments may be achieved.

In the embodiments shown in FIGS. 1 and 2, the outlet 11 for granulated product of the granulation chamber 4 of the screw granulator 2 is closely coupled to the granulated product supply conduit 35 of the fluid bed dryer 3 by means of a transition piece 39 that is connected with the granulated product supply conduit 35 by means of the rotational coupling 38. Transport air may be drawn from the transport air inlet 12, through the transition piece 39 and the granulated product supply conduit 35, by maintaining the separate processing compartments at sub-atmospheric pressure.

Figure 6:
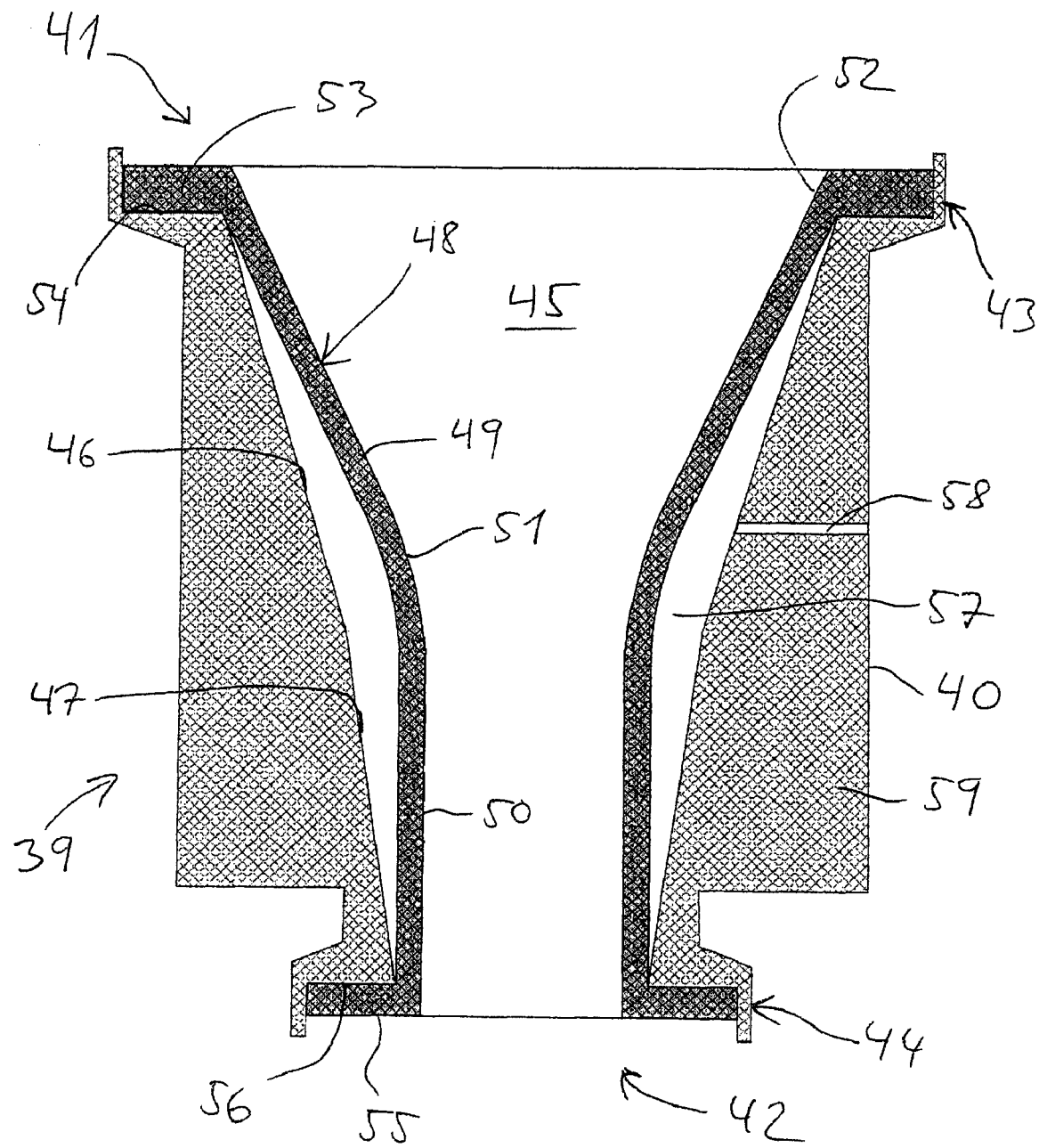
FIG. 6 shows an axial section through a transition piece of the apparatus shown in FIGS. 1 and 2.

FIG. 6 shows an axial cross-section through the transition piece 39 for the transfer of granular material. The transition piece comprises a substantially tubular housing 40 made of a rigid material, such as plastic or metal and having an inlet end 41 and an outlet end 42. The inlet end 41 has an inlet flange connection 43, and the outlet end has an outlet flange connection 44, whereby the diameter of the inlet flange connection is substantially larger than the diameter of the outlet flange connection. A passage 45 through the housing 40 from the inlet flange connection 43 to the outlet flange connection 44 is formed by means of a first conical section 46 and a second conical section 47, whereby the internal diameter of the housing 40 is decreased substantially from the inlet end 41 to the outlet end 42.

The passage 45 through the housing 40 is provided with a liner 48 made of a flexible material, such as silicone rubber, thereby forming a flexible passage through the transition piece 39. The flexible liner 48 is composed by a substantially conical section 49 and a substantially cylindrical section 50, so that a smaller end 51 of the conical section is forming a smooth transition with the cylindrical section 50. A larger end 52 of the conical section 49 is provided with a flange 53 abutting a flange surface 54 of the inlet flange connection 43 of the housing 40. When inlet flange connection 43 is connected with a not shown flange connection of the outlet 11 for granulated product of the granulation chamber 4 of the screw granulator 2, the flange of the liner will is sandwiched tightly between said not shown flange connection and the inlet flange connection 43. Opposite the transition with the conical section 49, the cylindrical section 50 is provided with a flange 55 abutting a flange surface 56 of the outlet flange connection 44 of the housing 40. When the outlet flange connection 44 is connected with a not shown flange connection of the rotational coupling 38 of the product supply conduit 35 of the fluid bed dryer 3, the flange 55 of the flexible liner 48 will be sandwiched tightly between said not shown flange connection and the outlet flange connection 44. In this way, the circumference of the flexible liner 48 is connected in a fluid tight manner with the housing 40 at each end of the flexible liner 48.

Between the housing 40 and the flexible liner 48, an annular enclosure 57 is formed in the passage 45. The flexible liner 48 is shown in its relaxed state, whereby the annular enclosure 57 forms a chamber having a volume greater than zero. The annular enclosure 57 is by means of a control fluid connection 58 through a wall 59 of the housing 40 connected with a not shown suction device and/or a pressurized fluid source. The control fluid may be any suitable kind of gas or liquid or a combination thereof. By changing the fluid pressure inside the annular enclosure 57 relative to the fluid pressure inside the flexible passage, the form of the flexible liner 48 may be changed, whereby material, such as possibly wet granules, built up on the inside of the flexible liner 48 in the flexible passage may be loosened. Furthermore, by regularly varying said fluid pressure, building-up of material on the flexible liner 48 may be substantially avoided.

The fluid pressure inside the annular enclosure 57 may be controlled by means of a control valve governed by means of a computer. The control valve may, for instance, be a solenoid valve having three positions for either closing the control fluid connection, connecting it with a suction device or connecting it with the surroundings. Thereby, for instance, it is possible to evacuate fluid from inside the annular enclosure 57 in order to deform the flexible liner 48 relative to its form shown in FIG. 6, maintain the obtained form during a period of time by closing the control fluid connection and subsequently allowing fluid to enter the annular enclosure from the surroundings in order for the flexible liner to obtain its form shown in FIG. 6 again or obtain an even more constricted form, if the fluid pressure inside the flexible passage is lower than the fluid pressure at the surroundings. If necessary, the flexible liner 48 may even be constricted to close the flexible passage.

Alternatively, the control valve may be adapted to connect the control fluid connection 58 with a not shown pressurized fluid source. The control valve may also be arranged to alternately connect the control fluid connection to the suction device and a not shown pressurized fluid source. In any case, the computer may be adapted to activate the control valve periodically, at regular or irregular intervals, or substantially continuously.

In another, not shown embodiment, the flexible liner may, in its relaxed state, fit the form of the passage, so that the annular enclosure forms a chamber having a volume equal zero. In that case, the control fluid connection may be connected to a not shown pressurized fluid source in order to change the form of the flexible liner, whereby material built up on the inside of the flexible liner in the flexible passage may be loosened.

Alternatively to the control valve, the annular enclosure can be connected to a source of variable fluid pressure capable of applying suction or pressure and holding or varying that suction or pressure with time. Thereby, the annular chamber can also be vented to atmosphere. Alternatively to using a computer, also a very simple control system may be used, even a pneumatic system.

Figure 3:
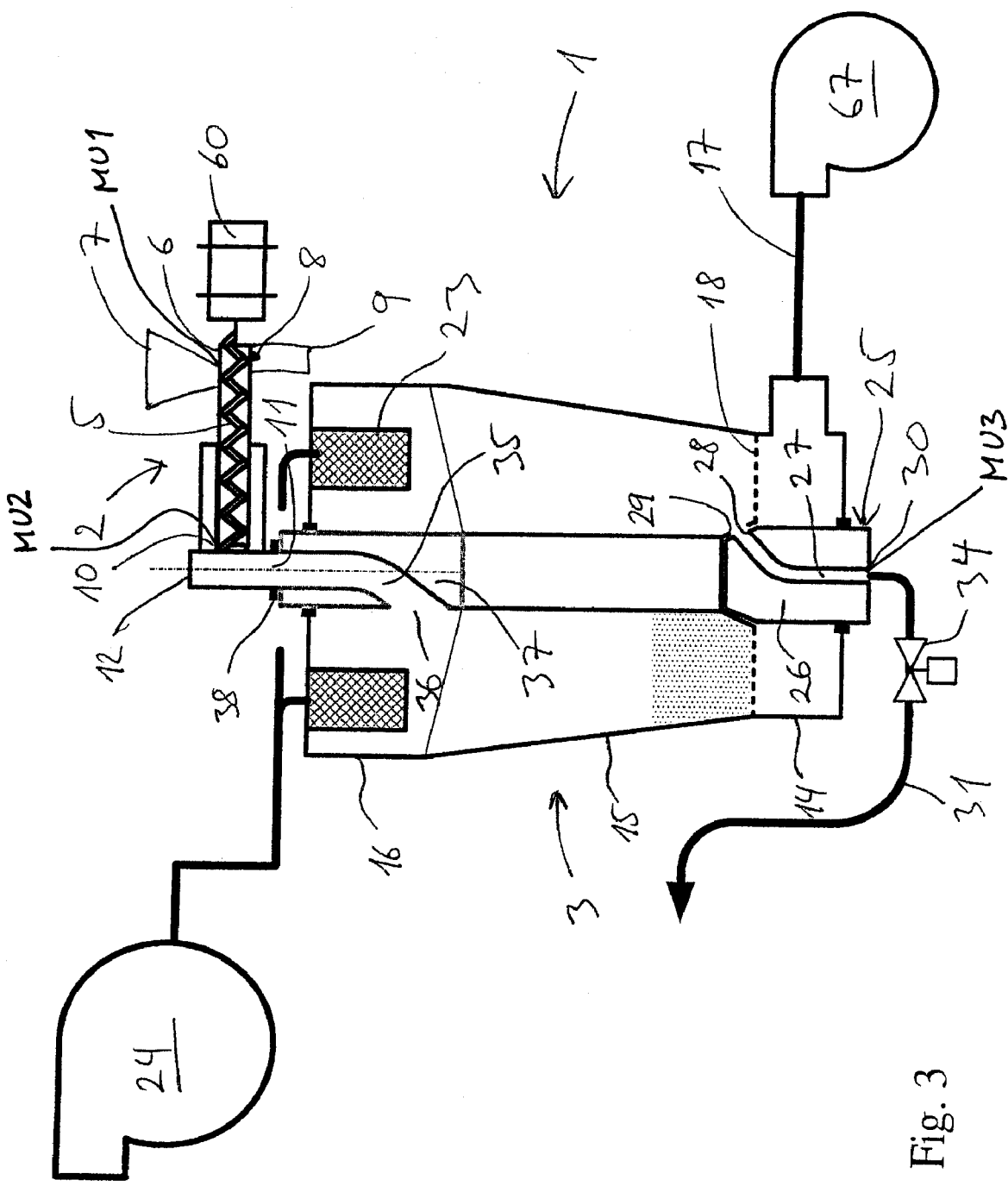
FIG. 3 to 5 show different embodiments of the apparatuses shown in FIGS. 1 and 2.
Figure 4:
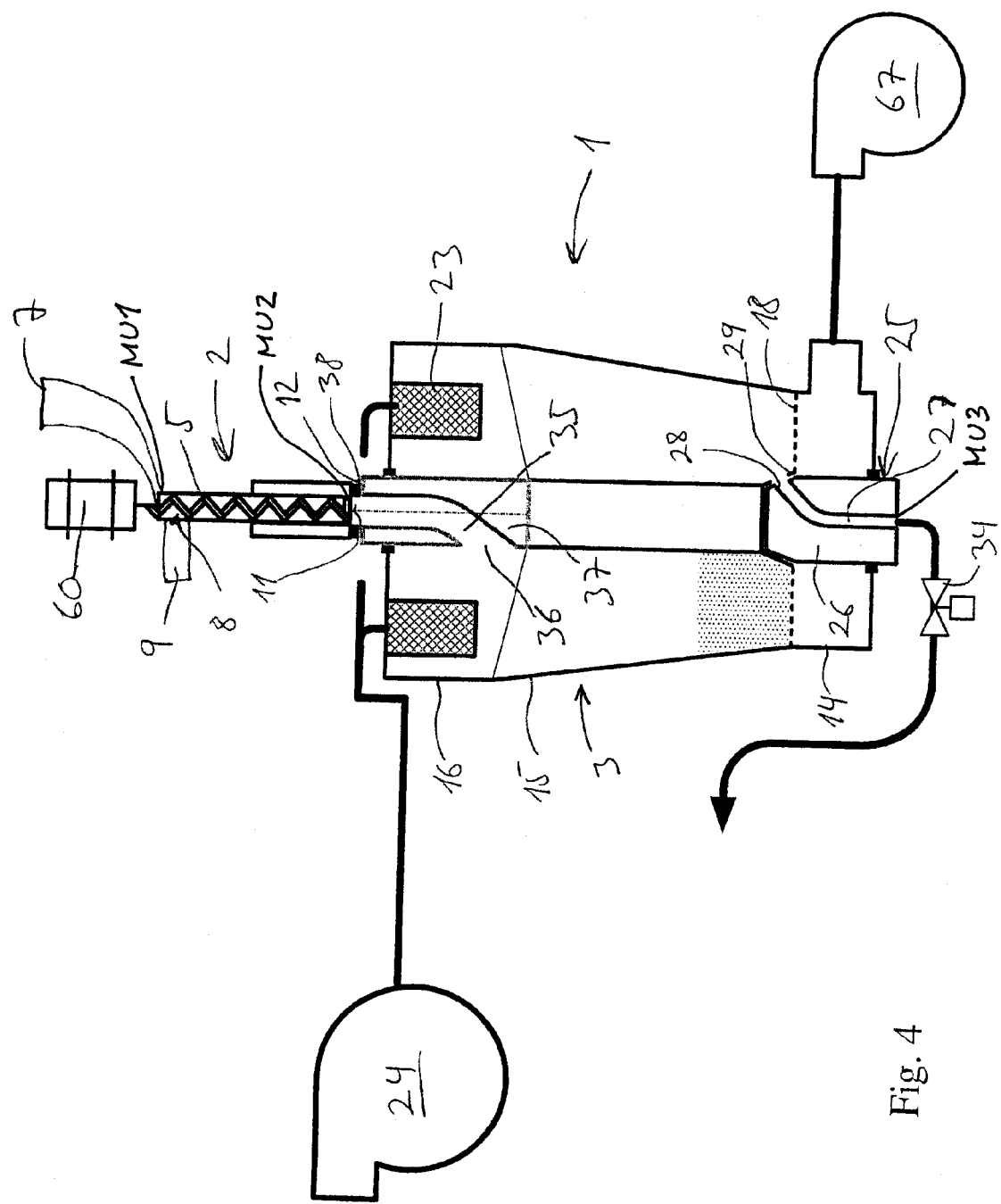

FIGS. 3 and 4 show embodiments corresponding to those of FIGS. 1 and 2, whereby the transition piece 39 has been omitted, and the outlet 11 for granulated product of the granulation chamber 4 of the screw granulator 2 is directly coupled to the granulated product supply conduit 35 of the fluid bed dryer 3 by means of the rotational coupling 38. In order to avoid product build-up in the granulated product supply conduit 35, the conduit 35 has been carried out as a rigid tube having a relatively large and substantially constant cross-sectional dimension corresponding substantially to a cross-sectional dimension of the outlet 11 for granulated product of the granulation chamber 4. As the cross-sectional dimension of the pathway for the material from the outlet of the granulation chamber to the outlet of the granulated product supply conduit of the fluid bed dryer is not narrowed, the risk of material clogging up is minimized. In this embodiment, a transport air inlet 12 may be arranged at the inlet of the granulated product supply conduit 35. However, with appropriate control of the pressure of the fluidizing gas by means of the fan 67, so that the screw granulator is not affected adversely by a too large gas or air through flow, the transport air inlet 12 may be omitted. In that case, the transport of granulated product from the outlet of the granulation chamber to the outlet of the granulated product supply conduit of the fluid bed dryer may be performed substantially by gravity, and the pressure in the processing compartments of the fluid bed dryer may be maintained close to atmospheric pressure.

Figure 7:
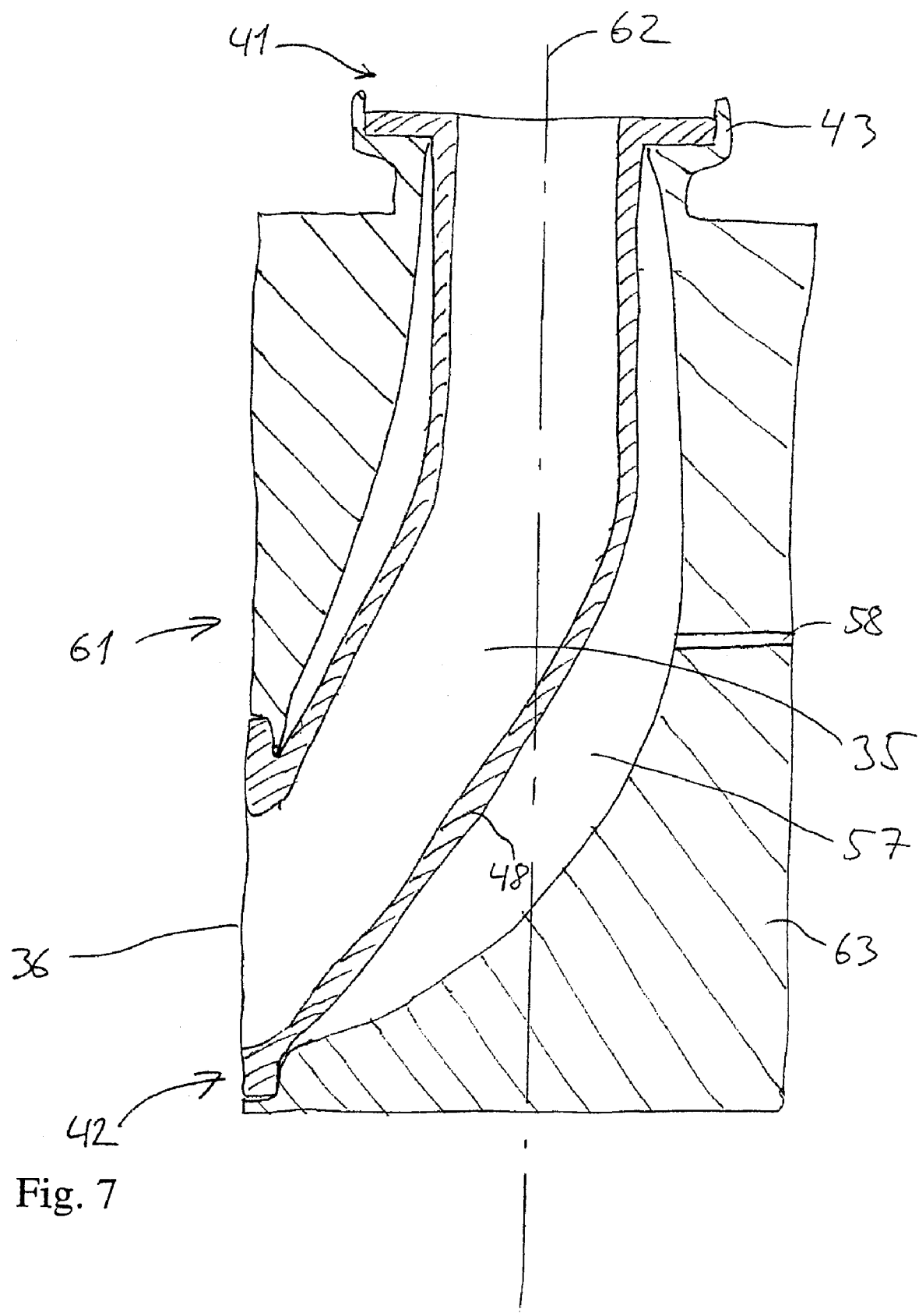
FIG. 7 shows an axial section through a granulated product supply conduit arranged rotatably and provided with a flexible liner.

In the embodiments shown in FIGS. 3 and 4, the granulated product supply conduit 35 of the fluid bed dryer 3 may alternatively be carried out as a rotary transition piece 61, as shown in FIG. 7, having a housing 63 with a rotational axis 62. Like the transition piece shown in FIG. 6, the rotary transition piece 61 of FIG. 7 has an inlet end 41 with an inlet flange connection 43 and an outlet end 42. However, the outlet end 42 has no flange connection, but opens out laterally in relation to the rotational axis 62. Furthermore, in the shown embodiment, the diameter of the inlet flange connection is substantially the same as the diameter of the outlet flange connection, but it may be larger. The inlet flange connection 43 is by means of the rotational coupling 38 (only indicated in FIGS. 3 and 4) connected to the outlet 11 of the granulation chamber 4.

The passage through the housing 63 is provided with a liner 48 made of a flexible material, such as silicone rubber, thereby forming a flexible passage through the rotary transition piece 61. Between the housing 63 and the flexible liner 48, an annular enclosure 57 is formed. The annular enclosure 57 is by means of a control fluid connection 58 through the housing 63 connected with a not shown suction device and/or a pressurized fluid source. The rotary transition piece 61 functions substantially in the same way as the transition piece 39 shown in FIG. 6 and described above.

Figure 5:
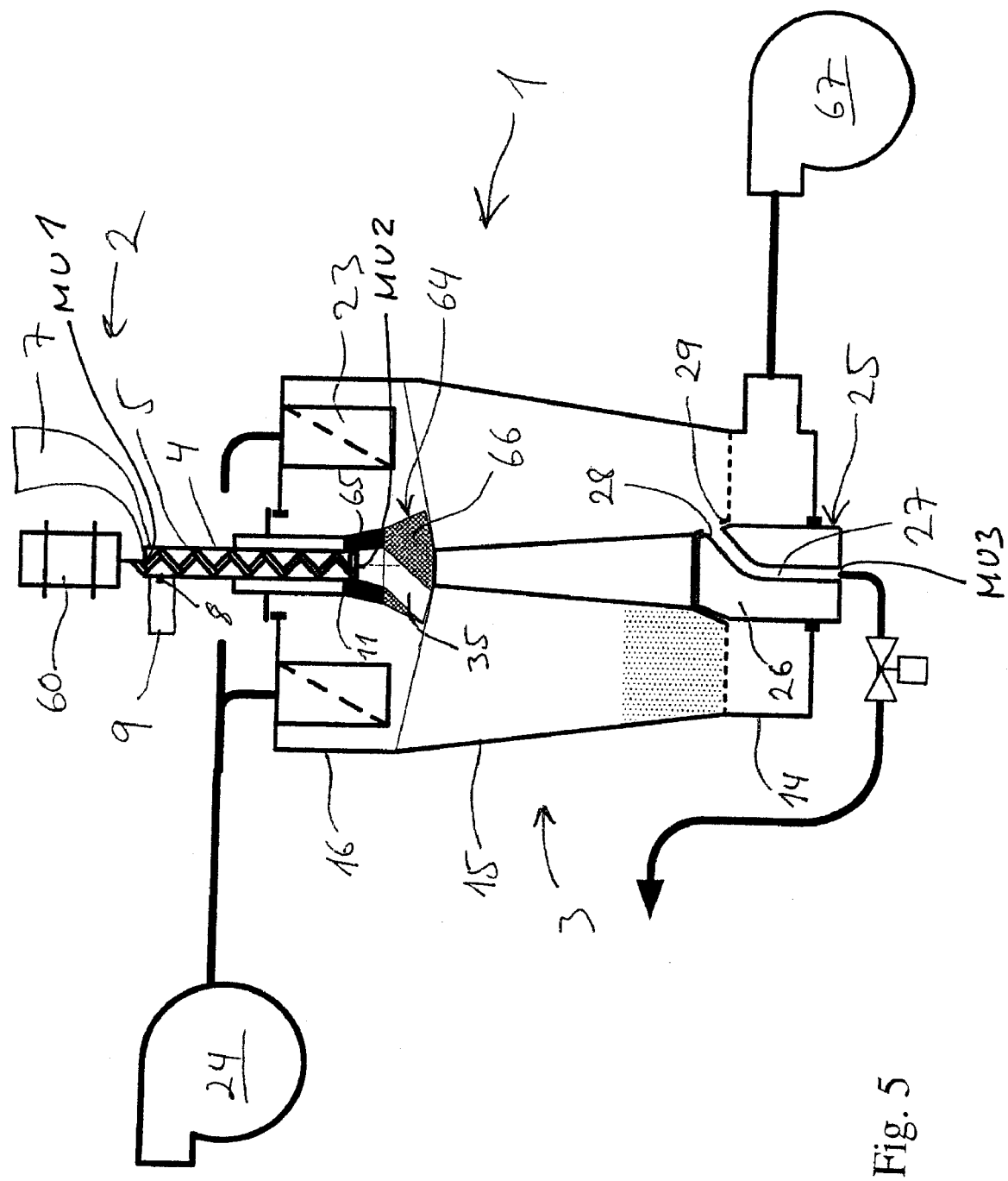

FIG. 5 shows yet another embodiment of the continuous granulating and drying apparatus 1 according to the invention. In this embodiment, the screw granulator 2 is arranged vertically; however, it may also be arranged horizontally. Alternatively to the other embodiments, in this embodiment, the granulated product supply conduit 35 of the fluid bed dryer 3 is arranged through a sonic conditioner 64 comprising a generator 66 of airwaves traveling at sonic speed. The sonic conditioner 64 is by means of a rotational coupling 65 connected with the outlet 11 for granulated product of the granulation chamber 4 of the screw granulator 2. The generator 66 of airwaves traveling at sonic speed is well known in the art and comprises an ultrasonic driving means, such as a piezoelectric transducer that is controlled by a not shown control unit.

Figure 9:
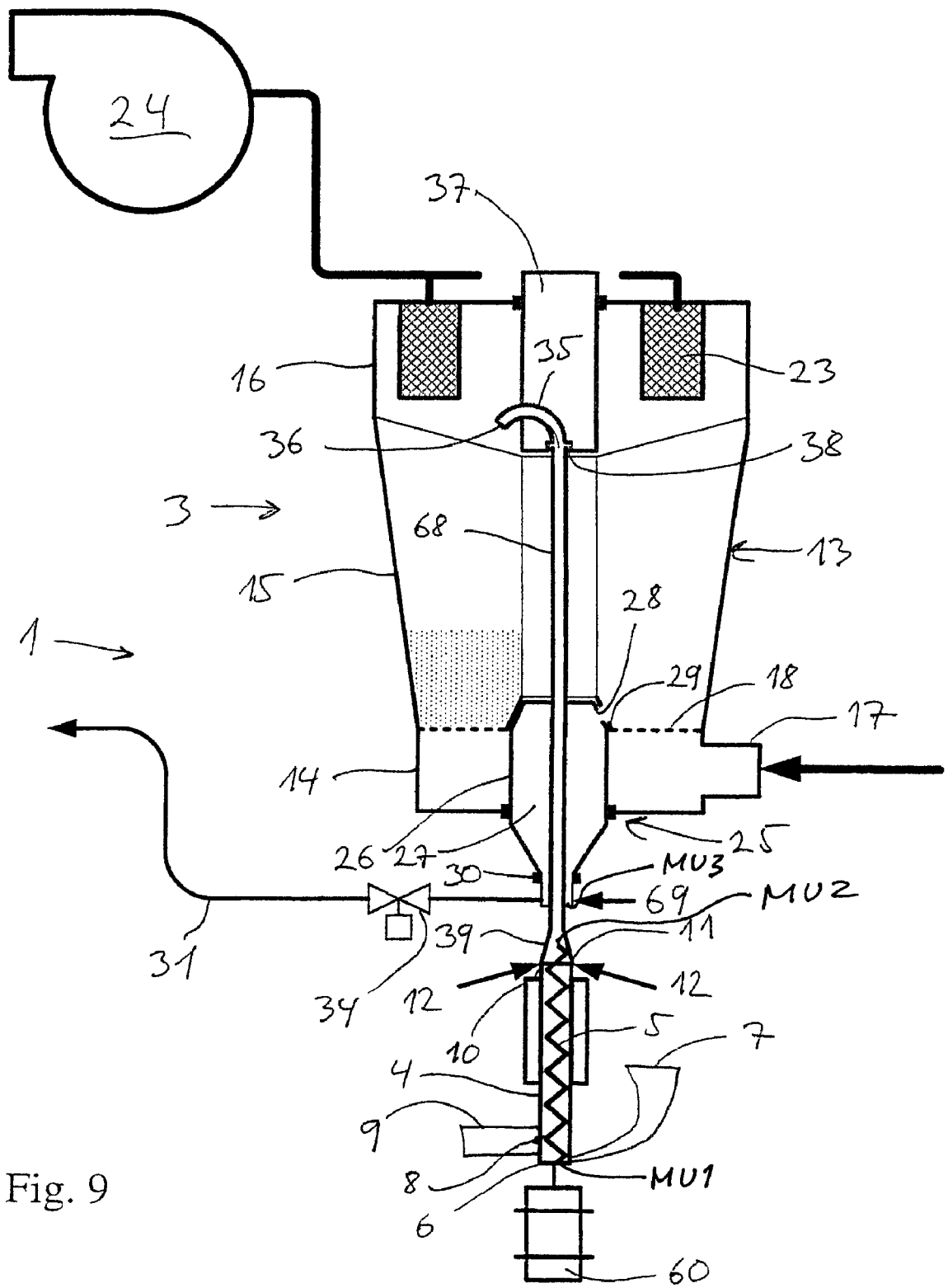
FIG. 9 is another embodiment of the apparatuses shown in FIGS. 1 and 2.

FIG. 9 shows yet another embodiment of the continuous granulating and drying apparatus 1 according to the invention. In this embodiment, the screw granulator 2 is arranged vertically below the fluid bed dryer 3; however, it may also be arranged horizontally below the fluid bed dryer 3. Alternatively to the other embodiments, in this embodiment, the rotational coupling 38 of the granulated product supply conduit 35 of the fluid bed dryer 3 is connected with a vertical supply tube 68 extending downward through the center of the common vessel 15 and through the plug 26 arranged rotatably coaxially with the common vessel 15, in order for the vertical supply tube 68 to be connected with the outlet 11 for granulated product of the granulation chamber 4 of the screw granulator 2. In this embodiment, the product discharge conduit 27 may be in the form of a cavity as it may be seen in the figure, so that the dry product may flow around the vertical supply tube 68 to the outlet tube 31. Transport air for the wet product is drawn from the transport air inlet 12, through the transition piece 39, the vertical supply tube 68, and the granulated product supply conduit 35, by maintaining the separate processing compartments at sub-atmospheric pressure. Possibly, the transition piece 39 may be omitted, if the diameter of the vertical supply tube 68 and of the granulated product supply conduit is large enough to avoid clogging of the granulated product. Furthermore, transport air for the dry product may be drawn from another transport air inlet 69 arranged at the second end opening 30 of the product discharge conduit 27 in order to facilitate transport of the dry product through the outlet tube 31. Obviously, the embodiment shown in FIG. 9 may be combined with the embodiments shown in the other figures; for instance, the transition piece 39 may be replaced by a sonic conditioner or the granulated product supply conduit 35 of the fluid bed dryer 3 may alternatively be carried out as a rotary transition piece 61, as shown in FIG. 7.

Figure 10:
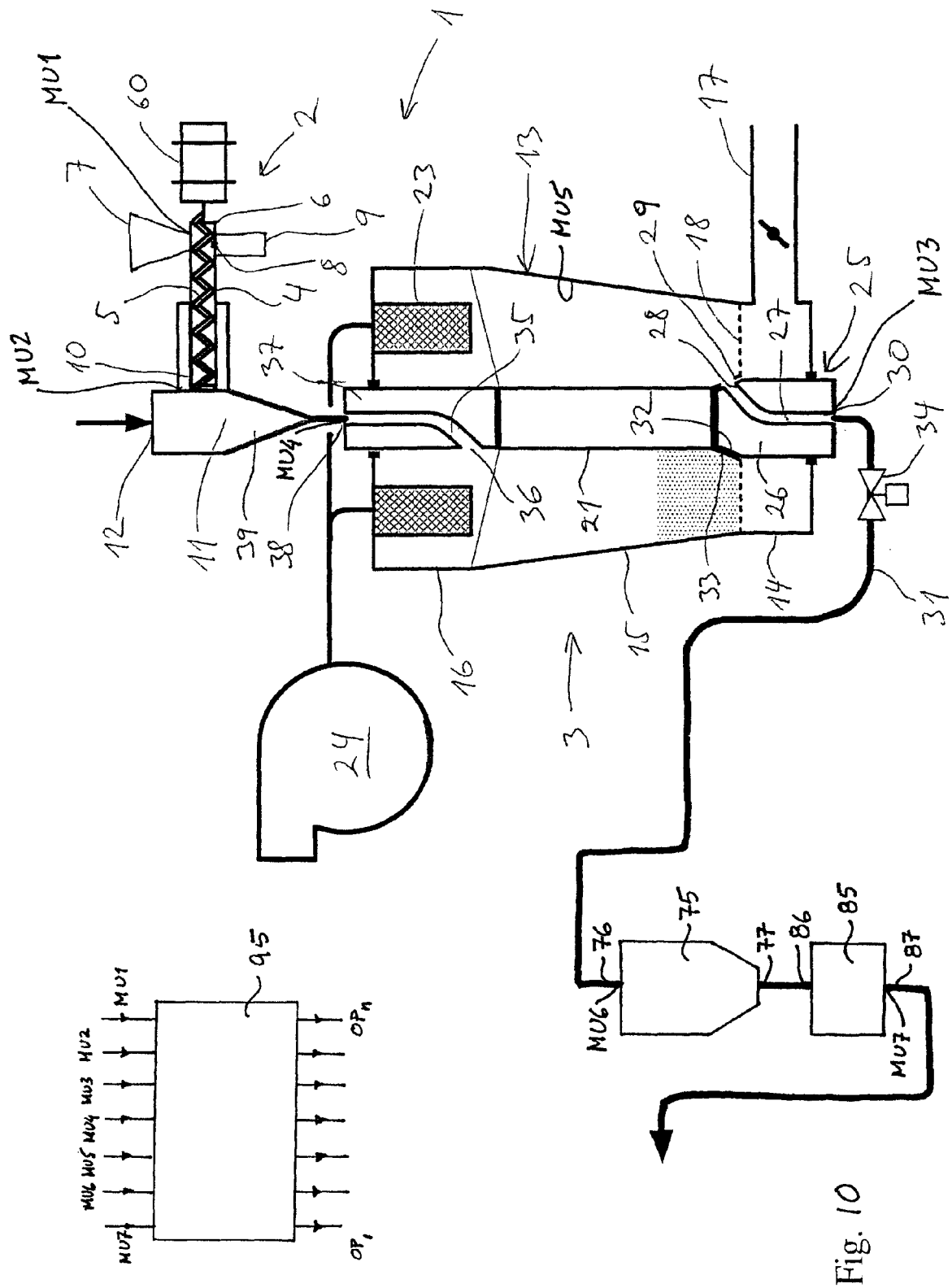
FIG. 10 shows in diagrammatic form yet another embodiment of a continuous granulating and drying apparatus according to the invention.

FIG. 10 shows yet another embodiment of the continuous granulating and drying apparatus according to the invention. Only differences relative to the embodiment shown in e.g. FIG. 1 will be described in detail. As in the above embodiments, elements of the FIG. 10 embodiment having the same or analogous function as corresponding elements in the FIG. 1 embodiment carry the same reference numerals.

In this embodiment, the product discharge conduit 27 of the dryer 3 is coupled to an inlet 76 of an intermediate collection vessel 75. The intermediate collection vessel 75 may for instance be formed as a hopper known in the art and comprises an outlet 77. The apparatus further includes a milling system 85 having an inlet 86 and an outlet 87, and the outlet 77 of the intermediate collection vessel 75 is connected to the inlet 86 of the milling system 85. In turn, the outlet 87 of the milling system 85 is connected to a suitable collecting unit, not shown. Alternatively, but not shown, the outlet 77 of the intermediate collection vessel 75 may be connected to the not-shown collecting unit. Correspondingly, the product discharge conduit 27 of the dryer 3 may be coupled directly to the inlet 86 of the milling system 85. As a further alternative, not shown, an intermediate vessel and/or a milling system may be present between the granulator 2 and the dryer 3.

Referring to FIGS. 1 to 5, 9 and 10, the continuous granulating and drying apparatus furthermore comprises a plurality of measurement units positioned at certain locations in the apparatus. The locations may for instance be chosen to meet requirements of a regulation. In order to secure the key quality factors of the process and product, the locations should at least include the so-called PCCPs (Product Process Critical Control Points).

In the embodiment shown in FIG. 1, said plurality of measurement units includes a first measurement unit MU1 located at the inlet 7 of the granulation chamber 4, a second measurement unit MU2 located at the outlet 11 of the granulation chamber 4, and a third measurement unit MU3 located at the product discharge conduit 27 of the fluid bed dryer 3.

In the embodiment of FIG. 2, the continuous granulating and drying apparatus additionally comprises a fourth measurement unit MU4 located at the granulated product supply conduit 35 of the fluid bed dryer 4 and a fifth measurement unit MU5 arranged to communicate with the interior of the fluid bed dryer 4.

Similar configurations of the measurement units apply to the embodiments of FIGS. 3 to 5 and 9.

In the embodiment of FIG. 10, in which the continuous granulating and drying apparatus includes the intermediate collection vessel 75 and the milling system 85, further measurement units, i.e. a sixth measurement unit MU6 and a seventh measurement unit MU7, are located at the inlet 76 of the intermediate collection vessel 75 and at the outlet 87 of the milling system 85, respectively. These sixth and seventh measurement units may replace and/or supplement, whichever appropriate, the other measurement units mentioned in the above.

The measurement units MU1 to MU7, and possible further measurement units, may comprise any measurement equipment suitable to the purpose. Such equipment includes equipment making use of NIR (Near Infra Red) spectroscopy, FBRM (Focused Beam Reflectance Measurement), microwave resonance spectroscopy, optical systems, laser diffraction, thermal imaging, LIF (laser-induced fluorescence), so-called Raman spectroscopy, torque or strain sensors etc. The measurement units may be connected to the respective parts of the apparatus in any suitable manner. For instance, the fifth measurement unit MU5 may be placed at a not shown window arranged in a wall or through the bed plate of each processing compartment of the fluid bed dryer, or in any suitable way, for instance projecting from above the fluid bed in the common vessel. The other measurement units may be connected to the relevant parts in a manner suitable to the specific location. As a further example, a spinning disk system may be located at the outlet of the milling system to present material to an optical measurement system in a format that allows reliable measurement. The spinning disk is specifically adapted for presenting a stream of dry granule that is falling as a result of gravity to an FBRM probe in a manner that allows it to distinguish large and small particles. An alternative possibility of measuring particle size is by means of laser diffraction of a stream of dry granule pneumatically conveyed from under the milling system to a further intermediate collection vessel (not shown). The stream of dry granule is either discharged to an Intermediate Bulk Container (IBC) connected to the apparatus or, if it is out of specification, removed to waste. Hence, in the stream of dry granule conveyed pneumatically from the outlet of the milling system, the particle size is measured using optical methods or laser diffraction, and the moisture content and density are measured by means of NIR or microwaves.

The at least one parameter measured in the process is selected from the group comprising size, shape, density, moisture content, and content of active substance, but further parameters may be measured as well. One or more parameters may be measured at each measurement unit.

Referring now to FIG. 10, examples of parameters measured at the individual measurement units include the following:

At the first measurement unit MU1 located at the inlet 7 of the granulation chamber 4, measurement is carried out of content of active substance, homogeneity of granulator inlet feed material, density and moisture content of inlet feed material, and particle size.

At the second measurement unit MU2 located at the outlet 11 of the granulation chamber 4, particle size, moisture content, density and homogeneity are measured.

A further not indicated measurement of the torque and power within the granulator may be carried out, these parameters being an indication of the granule properties, including final dissolution profile and tablet hardness.

At the fourth measurement unit MU4 located at the granulated product supply conduit 35 of the fluid bed dryer 4, particle size, moisture content, density and homogeneity are measured.

At the fifth measurement unit MU5 arranged to communicate with the interior of the dryer 4, measurement is carried out on particle size, moisture content and density, homogeneity, temperature as an indication of moisture content, outlet gas humidity.

At the third measurement unit MU3 located at the product discharge conduit 27 of the fluid bed dryer 4, particle size, moisture content, density and homogeneity are measured.

At the sixth measurement unit MU6 located at the inlet 76 of the intermediate collection vessel 75, particle size, moisture content and homogeneity are measured. Additional measurements may be carried out within the intermediate collection vessel 75 and at the outlet 77 thereof.

At the seventh measurement unit MU7 at the outlet 87 of the milling system 85, particle size, moisture content, density and homogeneity are measured. Additional measurements may be carried out at the inlet 86 of the milling system 85.

The plurality of measurement units MU1 through MU7 are, as shown in FIG. 10, connected to a control system 95 constituting a part of the apparatus 1. The control system 95 comprises a computer (not shown in detail) adapted to control various functions and processing parameters of the apparatus, such as the speed of the rotary shafts of the granulator, the feed rate of the powder material, the binder feed rate and the feed rate and proportions of liquid, solution, suspension and gas to a binder feed pump in response to data from the measurement units for the measurement of parameters, such as moisture content, density, active component, particle size and shape of the granules, fed into the processing unit or computer of the control system 95. Furthermore, the control system 95 includes a series of output ports $OP_1$ to $OP_n$ connected with relevant parts of the apparatus to provide feedback to the relevant parts of the apparatus. The feedback may be applied to the locations of the measurement units, but may also be applied to other locations. As a result of this feedback, it is possible to control the rotation of the drive motors for the fluid bed dryer, as well as operational parameters, such as flow rate and temperature of the fluidizing gas, and possibly of the temperature controlling gas, and product inlet flow, or the like, in dependence of the measured parameters. As an example, data from the measurement units at the dryer (MU3, MU4 and MU5 in the embodiments of FIGS. 2 and 10) is transferred to the control system 95, which is adapted to provide output to control process and operational parameters. In this control system 95, thermodynamic modeling is carried out using data relating to the temperature, inlet and outlet humidity conditions at and within the dryer to calculate an indication of the humidity of the finished product. Adjustment of operational parameters is carried out as a result of this modeling. Consequently, it is possible to adjust the size of the particles obtained, the amount of active content, moisture content, density, and dissolution and hardness properties of the final tablet.

In all of the above embodiments, measurement units are shown and described in an apparatus comprising a granulator and a dryer, in particular a fluid bed dryer. The fundamental principle underlying the invention, i.e. identifying critical locations and positioning measurement units at these locations to monitor certain parameters, is applicable to any apparatus involving granulation and/or drying.

The invention should not be regarded as being limited to the embodiments shown and described. Several modifications and combinations conceivable to a person skilled in the art may be carried out without departing from the spirit and scope of the appended claims.

What is claimed is:

1. A continuous granulating and drying apparatus for pharmaceutical products, comprising a granulator and a dryer, the granulator including a granulation chamber having a first end with an inlet for powder material and a binder feed port, and a second end with an outlet for granulated product, the dryer having a granulated product supply conduit and a product discharge conduit, wherein said apparatus includes a plurality of measurement units, wherein said dryer is a fluid bed dryer, wherein said fluid bed dryer comprises at least two separate processing compartments forming part of a common vessel being provided with radially extending partition walls separating the processing compartments from each other, each processing compartment having a product inlet and a product outlet, the fluid bed dryer further comprising a bed plate having openings for fluidizing gas and being arranged above a gas inlet, a gas outlet, a granulated product supply conduit arranged rotatably to selectively communicate with the product inlet of each separate processing compartment, respectively, a product discharge conduit arranged rotatably to selectively communicate with the product outlet of each separate processing compartment, respectively, wherein the outlet for granulated product of the granulation chamber has a substantially larger cross-sectional dimension than the granulated product supply conduit of the fluid bed dryer, wherein the outlet for granulated product is connected to the granulated product supply conduit of the inlet of the dryer by means of a transition piece comprising a housing having an inlet end mating the outlet for granulated product and an outlet end mating the product supply conduit, wherein the housing is provided with a flexible liner having a first end and a second end that has a substantially smaller cross-sectional dimension than the first end, the circumference of the flexible liner being connected in a fluid tight manner with the housing at each end of the flexible liner, so that an annular enclosure is formed between the flexible liner and the housing, and wherein the annular enclosure communicates with a control fluid connection.

2. A continuous granulating and drying apparatus as claimed in claim 1, wherein said plurality of measurement units includes a first measurement unit located at the inlet of the granulation chamber, a second measurement unit located at the outlet of the granulation chamber, and a third measurement unit located at the product discharge conduit of the dryer.

3. A continuous granulating and drying apparatus as claimed in claim 2, wherein said plurality of measurement units further includes a fourth measurement unit located at the granulated product supply conduit of the dryer and a fifth measurement unit arranged to communicate with the interior of the dryer.

4. A continuous granulating and drying apparatus as claimed in claim 1, wherein the granulator is a screw granulator including, in the granulation chamber, at least one rotary shaft provided with at least one granulating element.

5. A continuous granulating and drying apparatus as claimed in claim 4, wherein said at least one rotary shaft is horizontal.

6. A continuous granulating and drying apparatus as claimed in claim 4, wherein the at least one rotary shaft of the granulator forms an angle of from 0 to 85 degrees with the horizontal.

7. A continuous granulating and drying apparatus as claimed in claim 4, wherein said at least one rotary shaft is vertical.

8. A continuous granulating and drying apparatus as claimed in any one of claims 4 to 7, wherein the granulation chamber comprises at least two parallel rotary shafts, each of said rotary shafts being provided with at least one granulating element.

9. A continuous granulating and drying apparatus as claimed in claim 1, wherein the granulator is an extruder.

10. A continuous granulating and drying apparatus for pharmaceutical products, comprising a granulator and a dryer, the granulator including a granulation chamber having a first end with an inlet for powder material and a binder feed port, and a second end with an outlet for granulated product, the dryer having a granulated product supply conduit and a product discharge conduit, wherein said apparatus includes a plurality of measurement units, wherein the outlet for granulated product of the granulation chamber has a substantially larger cross-sectional dimension than the granulated product supply conduit of the fluid bed dryer, wherein the outlet for granulated product is connected to the granulated product supply conduit of the inlet of the dryer by means of a transition piece comprising a housing having an inlet end mating the outlet for granulated product and an outlet end mating the product supply conduit, wherein the housing is provided with a flexible liner having a first end and a second end that has a substantially smaller cross-sectional dimension than the first end, the circumference of the flexible liner being connected in a fluid tight manner with the housing at each end of the flexible liner, so that an annular enclosure is formed between the flexible liner and the housing, and wherein the annular enclosure communicates with a control fluid connection.

* * * * *